United States Patent
Wang et al.

(10) Patent No.: US 10,097,073 B2
(45) Date of Patent: Oct. 9, 2018

(54) LINEAR VIBRATION MOTOR

(71) Applicants: Hongxing Wang, Shenzhen (CN); Shun Guo, Shenzhen (CN); Lubin Mao, Shenzhen (CN)

(72) Inventors: Hongxing Wang, Shenzhen (CN); Shun Guo, Shenzhen (CN); Lubin Mao, Shenzhen (CN)

(73) Assignee: AAC TECHNOLOGIES PTE. LTD, Singapore (SG)

( * ) Notice: Subject to any disclaimer, the term of this patent is extended or adjusted under 35 U.S.C. 154(b) by 364 days.

(21) Appl. No.: 15/011,486

(22) Filed: Jan. 30, 2016

(65) Prior Publication Data

US 2016/0226360 A1 Aug. 4, 2016

(30) Foreign Application Priority Data

Feb. 2, 2015 (CN) .......................... 2015 1 0054707

(51) Int. Cl.
*H02K 16/02* (2006.01)
*H02K 33/16* (2006.01)

(52) U.S. Cl.
CPC .................... *H02K 33/16* (2013.01)

(58) Field of Classification Search
CPC ............... H02K 16/02; H02K 33/16
USPC ........................................ 310/25
See application file for complete search history.

(56) References Cited

U.S. PATENT DOCUMENTS

| | | | | |
|---|---|---|---|---|
| 8,829,741 B2* | 9/2014 | Park | ...................... | B06B 1/045 |
| | | | | 310/25 |
| 9,553,497 B2* | 1/2017 | Kim | ...................... | B06B 1/045 |
| 9,614,425 B2* | 4/2017 | Jin | ......................... | H02K 33/12 |
| 9,748,827 B2* | 8/2017 | Dong | .................... | H02K 33/16 |
| 9,815,085 B2* | 11/2017 | Chun | .................... | G06F 3/016 |
| 9,859,779 B2* | 1/2018 | Wang | ................... | H02K 33/12 |
| 9,871,432 B2* | 1/2018 | Mao | ...................... | H02K 33/16 |
| 9,876,419 B2* | 1/2018 | Wang | ................... | H02K 33/16 |
| 9,912,217 B2* | 3/2018 | Xu | ......................... | H02K 33/16 |
| 2011/0203061 A1* | 8/2011 | Takahashi | ............ | A61C 17/32 |
| | | | | 15/22.1 |
| 2016/0013710 A1* | 1/2016 | Dong | .................... | H02K 33/16 |
| | | | | 310/25 |
| 2016/0105089 A1* | 4/2016 | Shi | ........................ | H02K 33/18 |
| | | | | 310/25 |
| 2017/0214307 A1* | 7/2017 | Katada | .................. | H02K 33/16 |
| 2018/0026511 A1* | 1/2018 | Akanuma | ............ | H02K 35/02 |

* cited by examiner

*Primary Examiner* — Forrest M Phillips
(74) *Attorney, Agent, or Firm* — Na Xu; IPro, PLLC

(57) ABSTRACT

A linear vibration motor is provided in the present disclosure the linear vibration motor includes a cabinet having a receiving space, a first magnet received in the accommodation space and fixed in the cabinet; a magnetic core fixed in the cabinet, opposite to the first magnet, with a coil winded on the magnetic core, a vibrating part received in the receiving space, suspended between the first magnet and the magnetic core; and a supporting part for suspending the vibrating part, and the vibrating part includes a third magnet repulsing the first magnet, the coil having a changing current to magnetize the magnetic core to repulse with the third magnet.

10 Claims, 3 Drawing Sheets

LINEAR VIBRATION MOTOR

FIELD OF THE DISCLOSURE

The present disclosure generally relates to vibration motors, and more particularly, to a linear vibration motor applicable to a portable electronic product.

BACKGROUND

With the development of electronic technologies, portable electronic products such as mobile phones, handheld game players, navigation devices or handheld multimedia entertainment devices, become more and more popular. These electronic products generally use vibration motors to provide functions of system feedbacks, such as incoming call prompting, message prompting, navigation prompting, and vibration feedback in game players. The above-mentioned functions all depend on the performance and service life.

A related vibration motor includes a cabinet, and a vibrating part received in the cabinet and an elastic element for suspending and supporting the vibrating part. The elastic element provides driving force to the vibrating part according to the electromagnetic force (which is known as Lorentz force) applied on the vibrating part. In this case, the vibration intensity of the linear vibration motor is limited by the size of the linear vibration motor, and thus to the vibration increase may depend on a enlarged size of the motor, which degrades the miniaturization of vibration motors Moreover, the elastic element is easy to suffer elastic failures and fatigues after long-time use. Thus the performances and service life of the linear vibration motor will be affected.

Accordingly, it is necessary to provide a new vibration motor which can overcome the aforesaid problems.

DETAILED DESCRIPTION

Hereinbelow, the present disclosure will be further described with reference to the attached drawings and embodiment thereof. It should be understood the specific embodiments described hereby is only to explain this disclosure, not intended to limit this disclosure.

Figure 1:
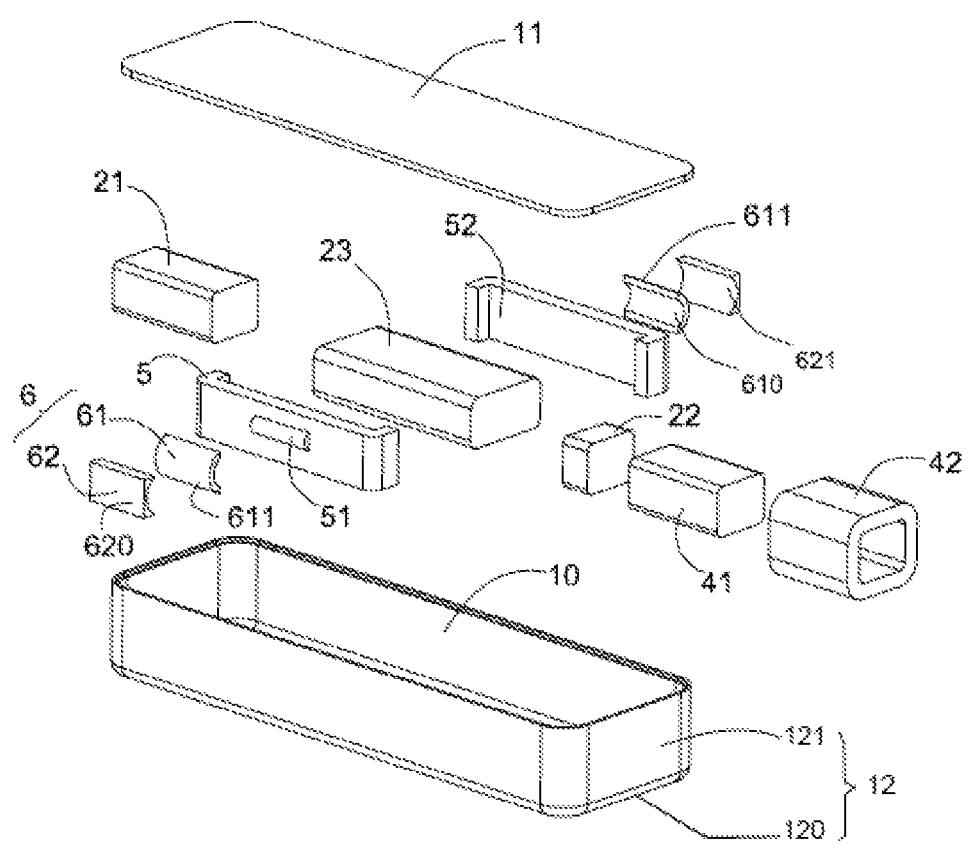
FIG. 1 is an exploded view of a linear vibration motor according to an embodiment of the present disclosure.
Figure 2:
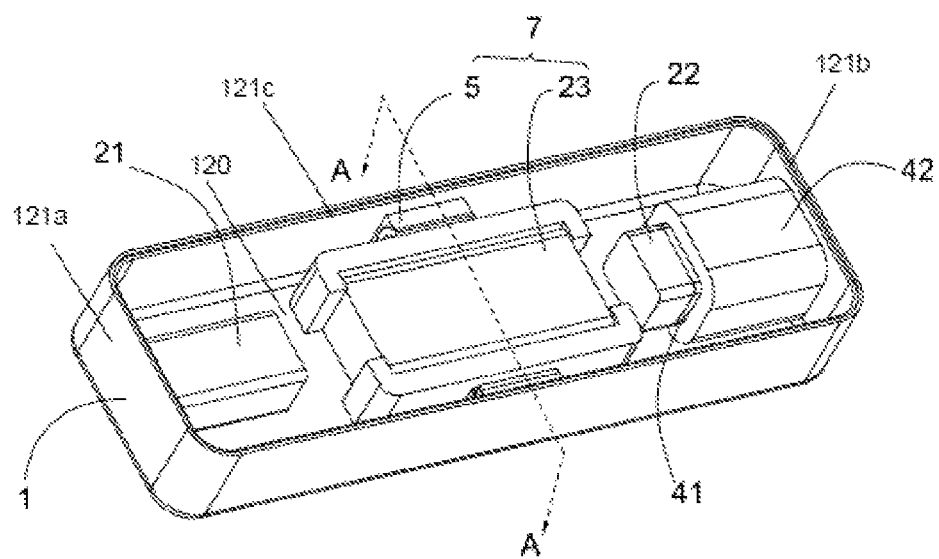
FIG. 2 is an assembled view of the linear vibration motor in FIG. 1.

FIG. 1 is an exploded view of a linear vibration motor according to a first embodiment of the present disclosure. FIG. 2 is an assembled view of the linear vibration motor in FIG. 1. The linear vibration motor includes a cabinet 1 with a receiving space 10 therein, and a magnetic vibrating part 7 received in the receiving space 10. The cabinet 1 is shaped as a strip with a long axis, and the magnetic vibrating part 7 can vibrate along the long axis.

Figure 3:
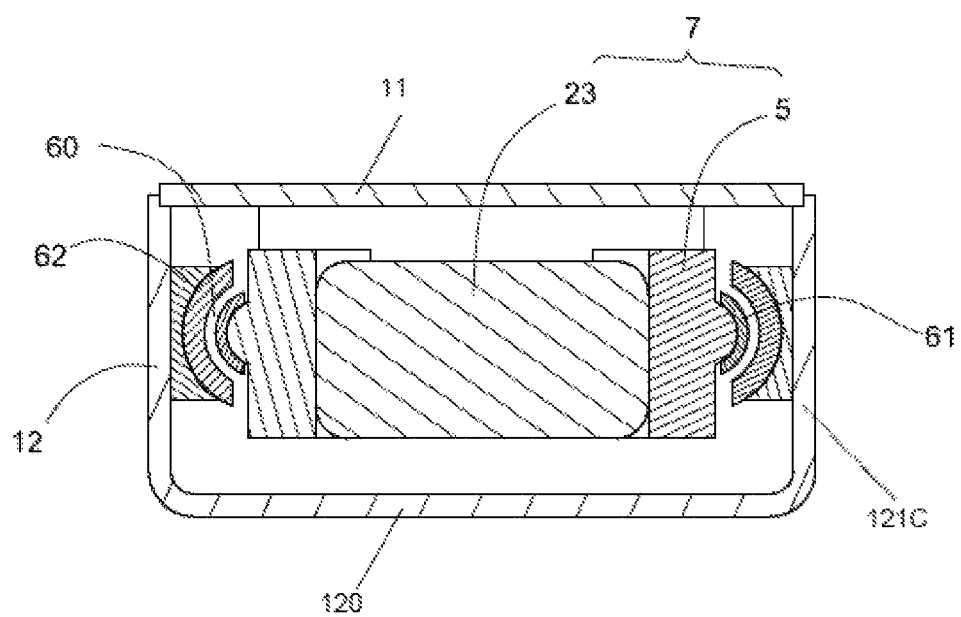
FIG. 3 is a cross-sectional view of the linear vibration motor in FIG. 2.

The cabinet 1 includes a case 12 having a bottom wall 120 and a side wall 121 extending perpendicularly along the bottom wall 120, and a cover 11 assembled with the case 12. The receiving space 10 is formed by the case 12 and the cover 11. As shown in FIGS. 1-3, the side wall 121 surrounding the vibrating part 7 and fixing to the cover 11. The side wall 121 includes two opposing lateral sides 121a-121b and a connecting side 121c connecting opposing lateral side 121a with the other opposing lateral side 121b. The vibrating part 7 keeps a distance with both the bottom wall 120 and the cover 11, with neither directly nor indirectly contacting with the bottom wall 120 and the cover 11.

The magnetic vibrating part 7 is suspended in the case 12. A first magnet 21 is fixed on the lateral side 121a, in the case 12, and magnetically repulses with the magnetic vibrating part 7. A magnetic core 41 is fixed on the lateral side 121b, in the case 12, opposite to the first magnet 21, with a coil 42 winded thereon. A second magnet 22 is connected to the magnetic core 41, and magnetically repulses with the magnetic vibrating part 7. As shown in FIG. 2, the magnetic vibrating part 7 is mounted between the first magnet 21 and the second magnet 22. The magnetic vibrating part 7 magnetically repulses with the first magnet 21 and the second magnet 22. As the coil 42 is provided with a changing current so as to form a magnetic field which changes according to the current in the coil 42, the magnetic vibrating part 7 is driven by a force generated by the magnetic field. The linear vibration motor further includes a supporting part 6 fixed on the connecting side 121c in the case 12, for supporting the magnetic vibrating part 7.

The magnetic vibrating part 7 includes a third magnet 23 configured along the long axis of the case 12, and a mass 5 fixed on the third magnet 23 for enhancing the vibration of the magnetic vibrating part 7. Specifically, the mass 5 may one single block, and a through hole is defined on the mass 5 for receiving the third magnet 23. Alternatively, the mass 5 may include two or more fixing blocks cooperating with each other to fix the third magnet 23, and the masses 5 can respectively attach or connect to the third magnet 23 directly. As shown in FIGS. 1-2, the masses 5 have two blocks parallel with the long axis and symmetrically mounted on two sides of the third magnet 23, and each of them respectively forms a receiving slot 52 facing to the third magnet 23. The third magnet 23 is clasped by the receiving slots 52.

It should be understandable that the third magnet 23 may be one single magnet or a group of magnets, the long axis refers to the vibration direction of the magnet vibrating part 7 and shall not be used to limit the shape of the case, In fact, the case 12 can be of any regular or irregular shape, and in that case, a proper direction may be configured as the vibration direction.

Both the first magnet 21 and the second magnet 22 are magnetized along the vibration direction (i.e., the long axis direction) of the vibrating part 7, and the third magnet 23 is mounted between the first magnet 21 and the second magnet 22. The third magnet 23 repulses with the first magnet 21 and the second magnet 22, especially the repulsing force between the first magnet 21 and the third magnet 23 equals that between the second magnet 22 and the third magnet 23. Thus the magnetic vibrating part 7 may perform limited movements along the long axis controlled by the repulsing force between the third magnet 23 and other magnets, as the repulsing force can act as a restoring force to drive the magnetic vibrating part 7 to move.

The second magnet 22 is fixed on the magnet core 41 which is fixed in the case 12. The magnetic core 41 and the coil 42 winded thereon form an electromagnet. When the coil 42 is electrified, a magnet field is accordingly formed, and then the magnetic core 41 will get polarized in the field and generates a superposed magnetic field to form an enhanced field composed by the magnet field of the coil 42 and the superposed magnetic field. Advantageously, the enhanced magnetic field has a field direction the same with the second magnet's field direction. In this way, the repulsing force will be kept between the third magnet 23 and the second magnet 22, and thus the magnet vibrating part may achieve a balanced vibrating. Besides, an attractive force exists between the second magnet 22 and the magnetic core 41, and the third magnet 23 can be firmly fixed to the magnetic core 41.

As the magnetic field of the magnetic core 41 changes with the current change of the coil 42, the magnetic vibrating part will be driven by the repulsing force changing with the current. In this embodiment, the current in the coil 42 is a direct current, that is to say, the current has a constantly a positive or negative current direction but a changing magnitude, so that the repulsing force between the third magnet 23 and the second magnet 22 will also only change in magnitude. The magnitude of the current in the coil 42 may even decrease to zero, in which case, the current may be a biased sine wave or a biased square wave signal. When the current is enlarged, the magnetic vibrating part 7 gets driven by the repulsing force changing with the current to move toward the first magnet 21; when the current decreases, the magnetic vibrating part 7 will move back towards the second magnet 22; therefore, the magnetic vibrating part 7 can perform reciprocal movements between the first magnet 21 and the second magnet 22.

As illustrated in FIG. 1 and FIG. 3, the supporting part 6 is symmetrically configured on two sides of the magnetic vibrating part 7 along the long axis, including two complementary parts respectively mounted on the case 12 and on the magnetic vibrating part 7. Specifically, in this embodiment, the two blocks of the mass 5 respectively has a protrusion 51, especially a curved protrusion, extending from the lateral surface of the block towards the case 12.

The two complementary parts of the supporting part 6 includes a first curved magnet 61 fixed to the protrusion 51, and a second curved magnet 62 fixed to the case 12, with a distance 60 between the first curved magnet 61 and the second curved magnet 62. The first curved magnet 61 has a first contacting surface 610 attached to the protrusion 51, and a convex surface 611 opposite to the first contacting surface. The second curved magnet 62 includes a second contacting surface 620 fixed to the case 12 and a concave surface 621 opposite to the second contacting surface 620. The convex surface 611 is sheathed by the concave surface 621 with the distance 60 therebetween, and the convex surface 611 and the concave surface 621 are magnetized with a same polarity, i.e., the first curved magnet 61 repulses with the second curved magnet 62. Since supporting part 6 symmetrically configured on two sides of the magnetic vibrating part 7, the magnetic vibrating part 7 may achieve a balanced state along a short axis perpendicular to the long axis, and thus the magnetic vibrating part 7 can be suspended in the case 12.

Alternatively, the two complementary parts of supporting part 6 may also be a guide rail and guide groove respectively fixed to the case 12 and the magnetic vibrating part 7. In this case, the guide rail may be a contact rail or a rolling-boll rail, as long as the guide rail matches the groove to support the magnetic vibrating part 7.

In a second embodiment, the second magnet in the first embodiment is not essential. The magnetic vibrating part 7 is mounted between the first magnet 21 and the magnet core 41. As is the same with the first embodiment, the magnet core 41 is winded with the coil 42, and the first magnet 21 repulses with the magnetic vibrating part 7. The magnetic vibrating part 7 has a first end close to the first magnet 21, and a second end opposite to the first end. The adjacent ends of the first magnet 21 and the magnetic vibrating part 7 have a same polarity, therefore the first magnet 21 repulses with the magnetic vibrating part 7. When the coil 42 is not electrified, the magnetic vibrating part 7 moves to reach the magnet core 41. As the coil 42 electrified to have a current, a magnet field is accordingly formed, and then the magnetic core 41 will get polarized in the field. Especially, two adjacent ends of the magnetic core 41 and the magnetic vibrating part 7 have a same polarity. In this way, a repulsing force will be generated between the third magnet 23 and the magnetic core 41, and thus the magnet vibrating part may achieve a balanced vibrating along the long axis of the case 12.

What described above are only embodiments of the present disclosure, and it shall be noted that, modifications may be made by those of ordinary skill in the art without departing from the inventive concepts of the present disclosure, and all these modifications shall fall within the scope of the present disclosure.

What is claimed is:

1. A linear vibration motor, comprising:
   a cabinet having a receiving space;
   a first magnet received in the accommodation space and fixed in the cabinet;
   a magnetic core fixed in the cabinet, opposite to the first magnet, with a coil winded on the magnetic core;
   a vibrating part received in the receiving space, suspended between the first magnet and the magnetic core; and
   a supporting part for suspending the vibrating part;
   the vibrating part comprising:
   a third magnet repulsing the first magnet;
   the coil having a changing current to magnetize the magnetic core to repulse with the third magnet to form a magnetic field to generate a force to drive the vibrating part to vibrate along a long axis direction between the first magnet and the magnetic core on which the coil is winded on;
   the cabinet comprising a bottom wall, a cover opposing the bottom wall and a side wall extending from the bottom wall towards the cover, the side wall surrounding the vibrating part and fixing to the cover, wherein the side wall comprising two opposing lateral sides on one of which the first magnet is fixed and on the other of which the magnetic core is fixed, and a connecting side connecting the one of the opposing lateral sides with the other of the opposing lateral sides, and the supporting part is fixed on the connecting side;
   the vibrating part keeping a distance with both the bottom wall and the cover, with neither directly nor indirectly contacting with the bottom wall and the cover.

2. The linear vibration motor of claim 1, wherein a second magnet is mounted between the third magnet and the magnetic core, and the second magnet is fixed to the magnetic core and repulses with the third magnet.

3. The linear vibration motor of claim 2, wherein any two adjacent magnets of the first magnet, the second magnet and the third magnet are spaced apart from each other.

4. The linear vibration motor of claim 3, wherein the magnetic vibrating part further comprises a mass respectively attach or connect to the third magnet.

5. The linear vibration motor of claim 4, wherein two masses are symmetrically mounted on two sides of the third magnet, each of two masses respectively forms a receiving slot facing to the third magnet, and the third magnet is clasped by the receiving slots.

6. The linear vibration motor of claim 5, wherein each mass has a protrusion extending toward the connecting side.

7. The linear vibration motor of claim 6, wherein the supporting part is symmetrically configured on two sides of the magnetic vibrating part along a long axis, including two complementary parts respectively mounted on the case and on the magnetic vibrating part.

8. The linear vibration motor of claim 7, wherein the two complementary parts of the supporting part includes a first curved magnet fixed to the protrusion, and a second curved magnet fixed to the case, and the first curved magnet repulses with the second curved magnet, with a distance between the first curved magnet and the second curved magnet.

9. The linear vibration motor of claim 8, wherein, the first curved magnet has a first contacting surface attached to the protrusion, and a convex surface opposite to the first contacting surface; the second curved magnet includes a second contacting surface fixed to the case and a concave surface opposite to the second contacting surface; the convex surface is sheathed by the concave surface with the distance therebetween.

10. The linear vibration motor of claim 1, wherein the cabinet includes a cover and a case that cooperate with each other to form the receiving space, and the magnetic core is fixed in the case.

\* \* \* \* \*